United States Patent
Moisel et al.

(10) Patent No.: US 7,065,432 B2
(45) Date of Patent: Jun. 20, 2006

(54) DEVICE FOR IMPROVING THE VISIBILITY CONDITIONS IN A MOTOR VEHICLE

(75) Inventors: Joerg Moisel, Neu-Ulm (DE); Michael Holz, Senden (DE)

(73) Assignee: DaimlerChrysler AG, Stuttgart (DE)

(*) Notice: Subject to any disclaimer, the term of this patent is extended or adjusted under 35 U.S.C. 154(b) by 46 days.

(21) Appl. No.: 10/957,776

(22) Filed: Oct. 4, 2004

(65) Prior Publication Data

US 2005/0075760 A1    Apr. 7, 2005

(30) Foreign Application Priority Data

Oct. 2, 2003    (DE)  ............................ 103 46 508

(51) Int. Cl.
*B62D 41/00* (2006.01)
*B62D 6/02* (2006.01)

(52) U.S. Cl. ............................ 701/1; 340/438; 342/73

(58) Field of Classification Search .................. 701/1, 701/93; 340/438, 905, 441, 936, 988, 901, 340/439; 342/5, 73, 82, 104, 176, 179, 190
See application file for complete search history.

(56) References Cited

U.S. PATENT DOCUMENTS

| | | | | |
|---|---|---|---|---|
| 5,684,697 A | * | 11/1997 | Mullen | .................. 701/28 |
| 5,987,364 A | * | 11/1999 | Le Gusquet et al. | .......... 701/24 |
| 6,488,109 B1 | * | 12/2002 | Igaki et al. | .................. 180/169 |
| 6,547,424 B1 | * | 4/2003 | Hasumi et al. | ............. 362/465 |

FOREIGN PATENT DOCUMENTS

| | | |
|---|---|---|
| DE | 36 19 824 C2 | 12/1987 |
| DE | 40 07 646 A1 | 9/1991 |
| DE | 197 54 249 A1 | 6/1999 |
| DE | 100 43 087 A1 | 3/2002 |

* cited by examiner

*Primary Examiner*—Dalena Tran
(74) *Attorney, Agent, or Firm*—Akerman Senterfitt; Stephan A. Pendorf

(57) ABSTRACT

The invention relates to a device for improving the visibility conditions in a motor vehicle, having a radiation source for infrared radiation for irradiating the surroundings of the vehicle, having an infrared-sensitive camera for taking images of at least part of the irradiated surroundings, having a display unit for displaying collected image data, and having a control unit for controlling the device. Furthermore, a sensing unit for a recommended maximum velocity $v_{max}$ is provided and is connected to the control unit. A velocity sensor which is connected to the control unit is provided in such a way that the control unit causes the display to be switched off when the vehicle velocity v exceeds the maximum velocity $v_{max}$. The display is preferably switched on when the vehicle velocity v drops below the maximum velocity $v_{max}$.

16 Claims, 1 Drawing Sheet

DEVICE FOR IMPROVING THE VISIBILITY CONDITIONS IN A MOTOR VEHICLE

BACKGROUND OF THE INVENTION

1. Field of Invention

The invention relates to a device for improving the visibility in a motor vehicle.

2. Related Art of the Invention

DE 40 32 927 C2 discloses a device for improving the visibility in a motor vehicle having a radiation source for infrared radiation for irradiating the surroundings of the vehicle, and having an infrared-sensitive camera which takes images of the irradiated field of vision of the driver and makes available the collected image data to the driver by means of a display device which is embodied as a head-up display and in which the image data is visually superimposed as a virtual image on the external landscape. By means of this device, the driver can see considerably better at night or under bad weather conditions, in particular when he is dazzled by oncoming vehicles. As a result of the use of infrared radiation, the driver is, in contrast, not dazzled by the oncoming traffic. Such devices of this type are called night vision systems.

By virtue of the improved visibility, the vehicle driver may be induced to look exclusively at the display and not to observe the surroundings directly any more, which can lead to misinterpretations. In particular there is the risk of the field of vision being overestimated and of driving too quickly owing to the supposedly better visibility.

SUMMARY OF THE INVENTION

The invention is based on the object of specifying a device for improving the visibility conditions in a motor vehicle which reduces these disadvantages and as a result improves traffic safety.

This object is achieved by means of a device for improving the visibility conditions in a motor vehicle having the features of claim 1.

Advantageous developments of the device are the subject matter of the subclaims.

The device according to the invention for improving the visibility conditions in a motor vehicle is not only provided with the radiation source for infrared radiation, the infrared-sensitive camera, the display for displaying the image data which is collected by the camera and the control unit for controlling the device but also with a sensing unit for sensing a recommended maximum velocity $V_{max}$, which is connected to the control unit. A current velocity signal relating to the vehicle velocity V fed to the control unit via a velocity sensor which is connected to the device. The device is then controlled by the control unit as a function of the current vehicle velocity V in such a way that the collected image data is displayed on the display only when the velocity drops below the recommended maximum velocity $V_{max}$. This ensures that the vehicle driver cannot rely on the subjective impression of a particularly good, overestimated visibility owing to the device, and accordingly making an inappropriately high selection of his vehicle velocity V in accordance with his misinterpreted field of vision. As a result of the velocity-dependent deactivation when the recommended maximum velocity $V_{max}$ is exceeded, it is ensured that the vehicle driver is forced to rely on the direct sensing of the vehicle surroundings, i.e. for example on the usual sensing of the vehicle surroundings at night or when visibility is poor, and if he cannot make use of the improved visibility by means of the device which is made available to him by means of the display. As a result of this switching off he is forced to consider his velocity in the usual way since he no longer has the improved visibility available and accordingly has to select his driving velocity in accordance with the actual visibility in the visible range of light, that is to say without support by infrared radiation, and he must accordingly make a reduced selection. This leads to a situation in which the driver will usually reduce his vehicle velocity on the basis of the relatively poor visibility, which has a positive effect on traffic safety.

Units which determine vehicle-internal parameters and derive the recommended maximum velocity $V_{max}$ from the set of parameters have proven particularly effective as the unit for sensing a recommended maximum velocity $V_{max}$. For example, sensors for determining the type and the scope of steering movements, units for determining the acceleration of the vehicle, for example in the form of an inertia sensor, or engine management units which allow the engine control behavior and thus the driving behavior to be inferred, and units for determining the position of the vehicle, for example in the form of navigation devices with map data, have proven effective in this context. As an alternative to, or in addition to, these units for determining vehicle-internal parameters, units have also proven effective which collect information or parameters or properties outside the vehicle which are external, not internal to the vehicle, and use them to derive the recommended maximum velocity $V_{max}$. In particular road state sensors, weather state sensors or sensors for determining the road profile, for example on the basis of radar sensors, infrared sensors or optical sensors or road sign detectors or radio devices for transmitting the maximum permitted local velocity have proven valuable as particularly advantageous examples of external influencing variables for determining the recommended maximum velocity $V_{max}$. It has proven particularly effective here to provide sensing units which use both vehicle-internal parameters and external parameters, that is to say parameters of the vehicle surroundings, or properties or information from outside the vehicle for determining the recommended maximum velocity $V_{max}$. The recommended maximum velocity $V_{max}$ is determined by the sensing unit here either from one of these external or internal influencing variables or from a common consideration of a plurality of these influencing variables. This integrated evaluation of both internal and external influencing variables has proven a particularly reliable and safe way of evaluating the determination of the recommended maximum velocity $V_{max}$.

The recommended maximum velocity $V_{max}$ is determined either by means of a reference table in which a measure of the respective properties are sensed by means of the sensors of the evaluating means in the sensing unit, placed in a ratio with a measure of the maximum recommended velocity $V_{max}$, or by means of an arithmetic, for example a direct, conversion rule which calculates, for example on the basis of the temperature and the road state, a specific maximum recommended velocity $V_{max}$. By means of this determination of the maximum velocity $V_{max}$ as a function of the respective current external ambient conditions which have been sensed by means of the sensing unit and converted into a maximum velocity $V_{max}$, it is possible always to ensure a current behavior of the device or a current control behavior which is tailored to the current ambient conditions. This ensures that the suitable maximum velocity $V_{max}$ is selected as a function of the respective ambient conditions, for example the presence of ice on the road, and as a result the vehicle driver is reliably induced not to rely too much on the display of the image data on the display since the display of data is terminated when the maximum velocity $V_{max}$ is exceeded. This allows the driver to be prevented from taking into account only the image data displayed on the display and makes it possible to induce him at least to take account of the surroundings in a supplementary fashion, by sensing them directly. This leads to a marked improvement in the driving behavior and thus the safety of the vehicle driver, of the vehicle, and of the traffic as a whole.

It has also proven effective to use a classifier for determining the maximum velocity $V_{max}$ to evaluate the states of the vehicle or of the vehicle surroundings which are sensed by the sensors of the sensing unit. If, for example, the classifier interprets the profile of the underlying surface, by means of the steering behavior, as particularly bending road or as freeway, a significantly lower or respectively higher selection is accordingly made for the recommended maximum velocity $V_{max}$. It has also proven effective to determine the type of road on which the vehicle is currently located using the position determining means and the map data which is present in a navigation device, and to determine the maximum velocity $V_{max}$ therefrom, for example by means of reference tables, and use said maximum velocity $V_{max}$ to control the device for improving the visibility conditions in a motor vehicle, in such a way that when the velocity exceeds the recommended maximum velocity $V_{max}$ the display is controlled in such a way that the outputting of the image data collected by the camera is terminated.

In a corresponding way it has proven effective to use the sensing unit to sense the state of the underlying surface by means of one or more underlying surface state sensors and to select the maximum velocity $V_{max}$ as a function of the state of the underlying surface. If, for example, a poor state of the underlying surface is determined, which may be due, for example, to snow or an ice covering or moisture or may also result from uneven ground, a low setting is selected for the maximum velocity $V_{max}$, while the recommended maximum vehicle velocity $V_{max}$ is selected to be high, near to or equal to the legally permitted maximum driving velocity, when the underlying surface is dry or uniformly smooth, and there is therefore a good state of the underlying surface.

If the sensing unit is connected to weather sensors or if it contains weather sensors, in particular ones which determine the visibility or else ones which determine the presence of rain or snow or fog, a measure of the maximum permitted velocity $V_{max}$ can be derived therefrom. This specific determination of the maximum velocity as a function of the surroundings makes it possible to switch the display on or off very reliably and safely in such a way that the device according to the invention makes the improved visibility available to the driver in an appropriate velocity range, while the improved visibility is not made available to the driver at a velocity outside this appropriate velocity range, i.e. above the recommended maximum velocity $V_{max}$, which causes said driver to perceive or consider the surroundings directly and to check or to consider the driving velocity and usually to reduce the driving speed. Experience has shown that this leads to significantly safer driving style.

Particularly the combination of a plurality of sensor units for sensing a plurality of vehicle-internal or even a plurality of external influencing variables for determining the recommended maximum velocity $V_{max}$ has proven particularly advantageous by virtue of the fact that a very different control behavior can be brought about as a function of the current ambient conditions and vehicle conditions. It has proven particularly effective here to use a navigation device to determine the position of the vehicle and the type of road on which the vehicle is located and to determine therefrom the current legally permitted maximum velocity for a vehicle for the current position. It is also possible to use the map data which is typically present in the navigation device to take into account information about the velocity restrictions which apply to the current section of road by means of road signs. It has also proven effective to sense these road signs by means of optical sensors and an assigned image evaluating unit and to determine therefrom the maximum velocity which is permitted for the current position of the vehicle. This maximum permitted velocity is then reduced to the recommended maximum velocity $V_{max}$, in accordance with a calculation rule which is stored in the sensing unit and, if appropriate, by means of the influence of a road state sensor which detects, for example, a wet or smooth road. This recommended maximum velocity $V_{max}$ may differ drastically from the maximum permitted velocity. This example clarifies the interaction of various influences. However, the invention is not restricted to the combination of these two influencing variables—mentioned by way of example—of the corresponding sensors of the sensing unit but rather a large number of combinations of known sensors for sensing both external, relevant influencing variables and internal, relevant influencing variables is possible. In particular, the combination of a plurality of internal and external influencing variables gives rise to a very advantageous differentiated control behavior for the device for improving the visibility. This leads to increased acceptance with the user of the device, which in turn has a very positive effect on road safety.

Furthermore, it is possible, since the mode of operation of the device forces the driver to stop looking at the representation on the display, to reduce the risk of tending to overestimate the visibility conditions, and thus the risk of driving too fast since the vehicle driver then cannot rely only on the improved visibility which is provided by the device according to the invention. Overall, these aspects lead to an improvement in the safety of the vehicle driver or the driver and thus also of the traffic as a whole and the persons involved in it.

The representation on the display is preferably switched on again once the vehicle velocity V drops below the permitted velocity, which is preferably the recommended maximum velocity $V_{max}$ or is in the region of said velocity $V_{max}$. This leads to a situation in which the improved visibility is usually available when the velocity is appropriate, whereas at an excessively high velocity—above the recommended maximum velocity $V_{max}$—said visibility is not made available by the control unit in accordance with the control behavior. This leads to markedly improved road safety.

It has proven particularly advantageous to develop the device according to the invention in such a way that the display is switched on when the vehicle velocity V drops below the maximum velocity $V_{max}$ by the velocity difference $V_0$ in the vicinity of a few kilometers per hour. This "delayed" switching on of the representation of the display makes it possible to implement a switching behavior in the manner of a hysteresis, which can prevent unpleasant switching to and fro or a type of flickering of the display as a result of the switching off which is controlled by the control unit when the maximum velocity $V_{max}$ is exceeded and the switching on when the velocity drops below the maximum velocity $V_{max}$. This applies in particular to the selection of the velocity difference $V_0$ in the range of a few kilometers per hour, preferably in the range of 5% of the evaluated recommended maximum velocity $V_{max}$. By means of a predefined velocity difference $V_0$ in the range of a few kilometers per hour, very simple and safe control of the device is ensured, and said control can be implemented very easily and cost effectively. The connection of velocity difference $V_0$ to the recommended maximum velocity $V_{max}$ ensures a dynamic control of the differentiated switching-off and switching-on process of the display or of the camera in a way which is adapted to the situation, which gives rise to a very pleasant control behavior of the device. Such control which is adapted to the situation proves very pleasant for the vehicle driver, which has a positive effect on his driving behavior and thus on the road safety.

It has proven particularly advantageous to embody the control device in such a way that the recommended maximum velocity $V_{max}$ which is determined can be output to the vehicle driver in particular by means of the display. This leads to a situation in which the vehicle driver receives information about the recommended maximum velocity $V_{max}$ which is determined by means of the device according to the invention, and is thus inclined not to exceed this velocity and to drive safely below this velocity. This leads to a situation in which the improved visibility which is always made available to him by the device according to the invention is always available and he is not unpleasantly surprised by switching off so that he is forced to drive exclusively according to direct sensing and consideration of the surroundings.

Furthermore it has proved particularly effective to select the control by means of the control unit in such a way that the display is not switched off at the time when the recommended maximum velocity $V_{max}$ is exceeded but instead is switched off a predefined time period $t_0$ later, that is to say after a delay. This delayed switching off ensures rapid short-term successive switching off and on does not take place. Such switching to and fro is highly distracting for the vehicle driver and thus has an adverse effect on road safety, which is in fact what the invention is intended to prevent. This embodiment of the control device for switching off the display unit, the radiation source or the camera after a delay by a time period to ensures that a pleasant and reliable representation of the surroundings of the vehicle is provided by the device according to the invention in a very simple and cost-effective way. In this context, the period to is preferably within the range of half a minute or a few minutes. This leads to an increase in the traffic safety.

According to another preferred embodiment of the invention, in addition to the on and off switches for the device, an additional switch for switching on the display and/or the camera of the device is provided. This additional switch permits the image representation in the display to be actively and consciously switched on after the display or the camera has been switched off. This ensures that the vehicle driver can completely operate the device when necessary by actuating the additional switch and can thus obtain the advantage of the improved visibility. It has proven particularly effective here to implement the additional switch in the vicinity of the steering wheel, in particular in the form of a headlamp flasher switch or a rocker on the steering wheel. Arranging the additional switch in the vicinity of the steering wheel makes it possible to cause the switch to be activated without having to completely remove one or both hands from the steering wheel. This gives rise to safe handling of the device and thus increases the road safety. The use of the headlamp flasher switch as an additional switch for the device has proven particularly effective, ensuring that, as a result of the actuation of the headlamp flasher switch, not only the headlamp flasher but also the display or the camera is actuated again. This leads to a situation in which the surroundings of the vehicle which are irradiated by the infrared radiation source are at least partially sensed by the camera and the sensed image data can be displayed on the display.

It has proven particularly advantageous to make the switching off of the display, that is to say the ending of the representation of the images, sudden, that is to say abrupt. This has the advantage that a very simple control of the device, which is not susceptible to faults, is sufficient to bring about this positive effect according to the invention for increasing road safety.

Furthermore, according to another embodiment of the invention it has proven effective to make the switching-off process gradual so that the reproduction of images does not change from the complete concentration of image data to the switched-off state without the representation of images in an abrupt fashion but rather flows over a certain time period. In this context, this gradual switching off can be brought about in particular by restricting the brightness values or contrast values of the representation of images or of the display in such a way that the brightness range or contrast range which is increasingly reduced is continuously made available. This reduction of the brightness range or contrast range is carried out until these ranges have shrunk to zero and the display is thus switched off. Alternatively, it has also proven effective to disassociate the image data through artificial noise and to allow the disassociation to become stronger and stronger, which is brought about by increasing the noise component, until the image data can virtually no longer be perceived. This state corresponds to the switched-off display since this display is no longer suitable for representing the image data which is to be represented and which relates to the sensed surroundings which have been subjected to infrared irradiation. This switching-off process is preferably implemented as a linearly extending, gradual transition which is made possible only by a control which is not too complicated. Alternatively, nonlinear profiles are also conceivable. This inventive embodiment of the device with a gradual switching-off process ensures that the user receives information about imminent final termination of the representation of images before the representation of images on the display is finally switched off and so is not unpleasantly surprised. This has a positive effect on reducing the risk of an accident.

It has also proven particularly effective to signal the switching off to the vehicle driver before the switching off takes place. This early signalling is triggered in particular when a velocity just below the recommended maximum velocity is reached. This signalling is carried out, for example, by means of an optical representation in the display as an alternative to, or supplemented by, haptic signalling, for example by either vibrating the steering wheel, or by an audible signal, for example by the sounding of a short tone. This advance information before the switching off takes place ensures that the vehicle driver is prewarned to a particular degree before the switching off takes place. This leads to an improvement in the road safety. Audible warning signals have proven particularly effective since they can be sensed even without visual contact with the display, that is to say for example during the direct consideration of the surroundings of the vehicle, and as a result can usually be sensed by the driver of a vehicle without interruption or only with short interruptions, in such a way that he is not surprised by the switching off of the display or the representation of the display.

As an alternative to, or in addition to, this signalling as a prewarning, a warning signal is preferably issued by a signal transmitter as soon as the recommended maximum velocity is exceeded. This warning signal is, for example, implemented by means of a visual representation in the display, alternatively or additionally by a haptic warning signal for example, by vibrating the steering wheel, or by an audible warning signal, for example by the sounding of a short warning tone. In this context, the warning signal is directed in a way which is typically differentiated from the signal for the brief signalling of imminent switching off.

According to one preferred embodiment of the device, the control unit is embodied in such a way that the camera can be switched off in addition to the display. In this context, the camera is switched off with the display or a short time after it. In this way, it is possible for the camera always to be operational and to be able to supply image data while the display is operating, it being possible to display said image data on the display. Alternatively or additionally to the camera, the radiation source is switched on and off under the control of the control unit. This ensures that very efficient and reliable operation of the device takes place without the operational capability of the device being restricted. This also ensures that the camera or the radiation source cannot be switched off too early, and thus either with the display or directly after it or only much later since the camera and the radiation source consume a large amount of energy and can only be reactivated very slowly. This has a very positive effect on the consumption of energy of the device, which markedly improves the applicability of the device.

It has proven particularly effective to embody the device for improving the visibility conditions in such a way that the control device is connected to the radiation source for infrared radiation and is suitable for controlling this radiation source in terms of its radiation power, and/or in terms of the orientation of the radiation as a function of the vehicle velocity V. Here, the radiation source is changed either electronically or on the basis of mechanical, variable settings in such a way that different areas of the surroundings are irradiated, if appropriate, with different radiation powers. This embodiment makes it possible to sense the relevant vicinity of the surroundings of the vehicle very effectively, and thus safely sense this effectively irradiated vicinity of the surroundings by means of the camera and make this vicinity available to the vehicle driver, which leads to improved visibility which, in conjunction with the achieved velocity-dependent switching off or even switching on, provides a particularly advantageous and safe device for improving the visibility conditions. In this context, the radiation source is preferably controlled in such a way that as the velocity of the vehicle increases the radiation source is oriented further into the vicinity in front of the vehicle or alternatively or additionally the radiation power is increased. It has also proved effective to widen the angle of aperture of the radiation cone of the infrared radiation of the radiation source as the velocity V increases. This leads overall to improved illumination, which makes in particular the evaluation of images significantly more reliable in terms of the determination of the maximum velocity of the vehicle, thus leading to better and more pleasant control of the display and of the camera. In addition, the evaluation of the images from the camera can be adaptively adjusted in accordance with the orientated radiation source, which in turn leads to an improvement in the evaluation quality and to an improvement in the representation on the display.

According to one preferred embodiment of the device according to the invention, a second predefined maximum velocity $V_{smax}$ is provided, which leads to a situation in which, when this second predefined maximum velocity $V_{smax}$ is exceeded by the vehicle velocity V, the representation of the image data on the display is terminated and the display is thus switched off. When the vehicle velocity V drops below this second predefined maximum velocity $V_{smax}$, the display is switched on again. The second predefined maximum velocity $V_{smax}$ is preferably selected here in such a way that it corresponds to the maximum permissible velocity limit which is legally defined. It has proven effective here to select the second predefined maximum velocity $V_{smax}$ in accordance with the legal permissible maximum velocities for specific types of road. It has proven very advantageous here to determine the current type of road on which the vehicle is currently located by means of the image evaluation unit, which can be carried out, for example, by means of corresponding classifiers. On the basis of this evaluated, second maximum velocity $V_{smax}$ and the corresponding, achieved switching on and switching off when the velocity exceeds the latter or drops below it, in conjunction with the switching on and off when the first recommended maximum velocity $V_{max}$ is reached, the control behavior is provided which permits very safe use of the device according to the invention for improving the visibility. In particular, when the second predefined maximum velocity $V_{smax}$—which is typically higher than the recommended maximum velocity $V_{max}$—is exceeded, the display, and if appropriate, are always switched off, which forces the driver to sense or consider the surroundings directly and induce him to check the driving velocity V in the usual way. This leads to a more conscious driving style which results in a reduction in the risks of accidents and thus in an improvement in the road safety.

BRIEF DESCRIPTION OF THE DRAWING

The invention is explained below by means of an exemplary implementation of the device according to the invention for improving the visibility conditions in a motor vehicle. The invention is not restricted to this embodiment.

DETAILED DESCRIPTION OF THE INVENTION

Figure 1:
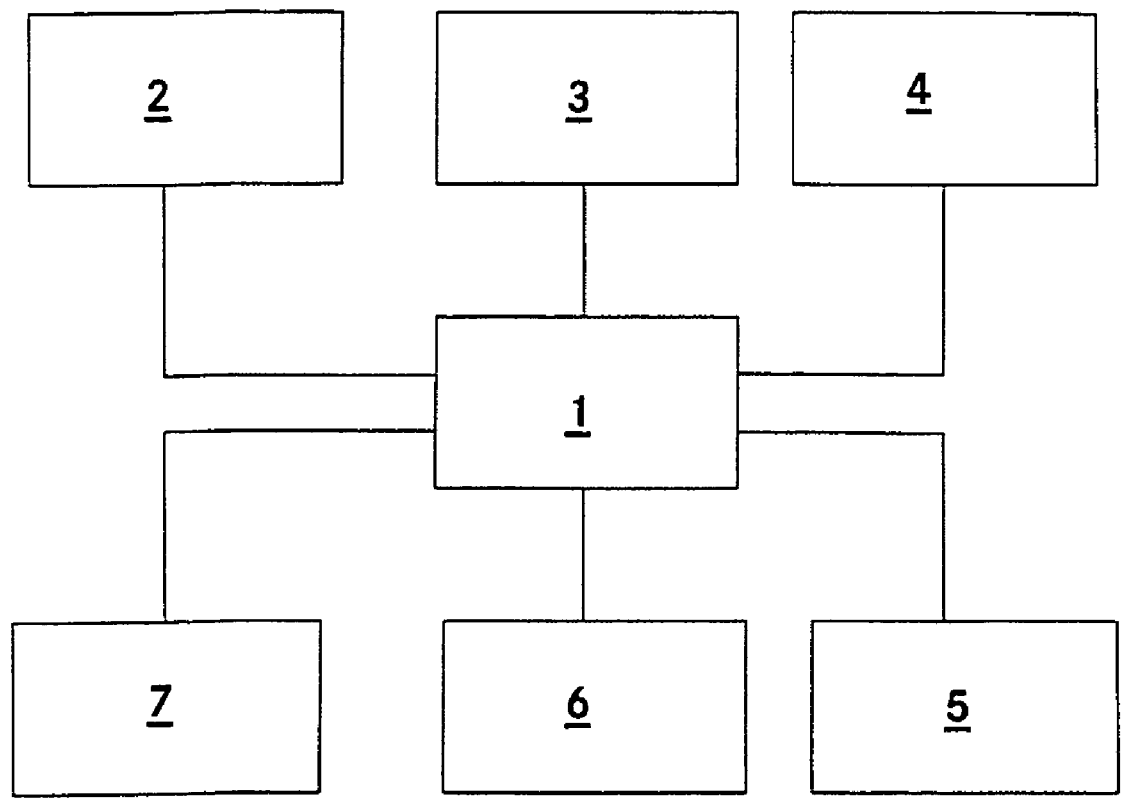
FIG. 1 shows a schematic design of the device according to the invention for improving the visibility conditions in a motor vehicle.

This device exhibits a radiation source 2 for infrared radiation which irradiates infrared radiation with a wavelength of approximately 800 nm. The radiation source 2 is implemented as an infrared laser. This radiation source 2 is arranged in the front vicinity of the vehicle in the vicinity of the headlights and irradiates the vicinity in front of the vehicle. In addition, this device has an infrared-sensitive camera 3 which is arranged in the vehicle and is orientated in such a way that it senses at least part of the surroundings which are irradiated by the infrared radiation source 2, and feeds the sensed image data to the display 4 via the control unit 1. By means of the display 4, the image data which is fed to it and sensed by the camera 3 is displayed and thus made available to a driver of a vehicle. The control unit 1 controls the infrared radiation source 2, the camera 3 and the display 4 in this context.

The infrared radiation source 2 radiates infrared radiation here, which is reflected at least partially from the surroundings and sensed by the infrared-sensitive camera 3 as reflected radiation and converts it into image data. This image data is represented by the display 4 either directly or after a certain degree of image signal processing by means of the image evaluation unit. As a result, the image which is represented on the display 4 is an infrared representation of the surroundings of the vehicle. Since the infrared reflective properties and irradiation properties of the surroundings differ from the properties in the visible light range, the image represented will also differ from the direct view of the surroundings by the vehicle driver. By using the device it is possible to use these differences advantageously, which leads to improved visibility in particular at night, but also in bad weather conditions such as in the rain or in fog.

The control unit controls the display 4 here as a function of the data sensed by the sensor unit 6, and the recommended maximum velocity $V_{max}$ derived therefrom, in such a way that the representation of images is switched on or off in a selective fashion. This is carried out in such a way that when the vehicle velocity v exceeds the maximum velocity $v_{max}$, the display is switched off, and switched on when it drops below said maximum velocity $v_{max}$. In this context, a velocity sensor is provided which is connected to the control unit and passes on the vehicle velocity v to the control unit 1. Furthermore, a sensing unit 6 is provided which is connected to the camera and to the control unit and which determines the sensed recommended maximum velocity $v_{max}$ and feeds it to the control unit 1. The control units controls the display with this information.

The sensor signals which are sensed by the sensors 7 which are assigned to the sensing unit 6 and the sensor signals which are sensed by the integrated sensors are evaluated by means of the sensing unit 6 with respect to the relevant internal or external properties, for example the state of the underlying surface, the field of vision or the current legally permissible maximum velocity and the maximum velocity $v_{max}$ is then determined as a function of these properties and the display 4 is subsequently switched on and off by means of the control unit 1 in a selective fashion. The switching on and off is carried out here, for example, by means of a reference table in which a measure of the respective properties or a combination thereof in a ratio with the maximum velocity $v_{max}$ is contained. This embodiment of the device makes it possible to ensure a very current and differentiated behavior of the device or control behavior which is tailored to the current situation in the surroundings in order to determine the maximum velocity $v_{max}$. This ensures that appropriate switching on and switching off times can be selected when the vehicle velocity exceeds or drops below the recommended maximum velocity $v_{max}$ as a function of the respective situation of the surroundings and thus the respective visibility conditions, the state of the underlying surface and the current legally permissible maximum velocity which is transmitted from beacons along the road to passing vehicles by radio, and the driver of a vehicle is thus reliably induced not to rely too much on the representation of the image data in the display 4. As a result, it is possible to prevent the driver from taking into account only the image data displayed on the display 4 and to at least additionally take into account the direct surroundings. This leads to a marked improvement in the driving behavior and thus the safety of the vehicle driver, of the vehicle, and also the entire traffic.

Via the radio device, the vehicle with the device according to the invention receives the legally permitted maximum velocity for the current section of road from the beacons arranged along the road with radio devices. This maximum velocity is fed to the sensing unit 6 via the control unit 1. Furthermore, a sensor for determining the state of the underlying surface and an interface for engine management, for example, with the CAN bus of the vehicle are also assigned to the sensing unit 6. Via the interface, the sensing unit receives, for example, information about the slip of the wheels, which permits conclusions to be drawn about spinning wheels as an internal signal and thus about a low level of grip. The sensor for determining the state of the underlying surface permits, for example, conclusions to be drawn about freezing snow, ice or a dry underlying surface. This information about the condition of the underlying surface, the slip and the information relating to the maximum legally permissible velocity for the current section of road makes it possible for the sensing unit 6 to determine the recommended maximum velocity $v_{max}$ which is adapted to the current driving situation, said determination being carried out by means of a reference table which exhibits logic linking of the various properties to one another and to the recommended maximum velocity $v_{max}$. The display 4 then has to be controlled by means of the control unit 1 in such a way that the representation of images is switched on or off in a selective fashion.

It is not necessary to completely switch off the display 4, it is sufficient for the operational capability of the device according to the invention to merely terminate the representation of images. The switching off of the display 4 requires the vehicle driver to look away from the display 4 and to direct his gaze directly on to the surroundings of the vehicle again. This ensures that he cannot be dazzled by the improved visibility which is provided by the device according to the invention or, owing to the improved visibility, that he misinterprets his own capabilities, the vehicle or the external circumstances and, for example, drives too quickly or with an inappropriate velocity. Instead, the switching off of the display 4 causes him to turn his attention directly to the surroundings of the vehicle and to adapt his driving behavior in the usual way to the visibility conditions which are then available to him and to use again the improved visibility after the device or the representation of images of the display 4 has been switched on again, without automatically being subject to a misinterpretation of the situation. This effect has proven very advantageous and very acceptable.

In addition to the switching off of the display 4 when the maximum velocity $v_{max}$ is exceeded, the control unit 1 also has the control function of switching off the camera 3 in a corresponding way, that is to say simultaneously or shortly afterwards. This additional control function ensures very effective operation of the device, in which case, on the one hand, the operational capability of the device is maintained without restriction but, on the other hand, the consumption of energy of the device is markedly reduced. The consumption of energy of such a device is of particular significance in a vehicle since such a vehicle has a large number of electronic components of which a large number operate simultaneously, correspondingly consuming a considerable amount of energy which the vehicle, with its autonomous energy supply, can make available only to a limited degree.

Furthermore, the control unit 1 is connected to the headlamp flasher switch 5 which is arranged as an additional switch in the vicinity of the steering wheel. The actuation of the headlamp flasher causes the display 4 or the camera 3 or even the radiation source 2 to be actuated again and switched on again under the control of the control unit 1. As a result of this simple embodiment of an additional switch for switching on the display 4 or the camera 3 or the radiation source 2, a very robust and safe and easy-to-handle device is provided which, on the one hand, makes available improved visibility for the driver of the vehicle, and on the other hand prevents undesired driving only in accordance with the display, and on the other hand permits actuation without significant difficulties. By using the headlamp flasher switch 5 it is possible for the driver to activate the display 4 or the camera 3 by actuating the headlamp flasher in parallel, without the driver having to release the steering wheel from his secure grip. This leads to very safe handling of the device and thus to an increase in road safety.

The control unit 1 is embodied in such a way that the termination of the representation of images and thus the switching off of the display 4 takes place in a gradual fashion. In this context, the sensed image data is artificially degraded during the gradual switching off by adding noise components until only noise is represented on the display 4, and the display 4 can thus be switched off, as it were. As the noise increases, the acceptable image information, and thus the represented image data becomes less useful for the vehicle driver, who is accordingly increasingly inclined to view and sense the surroundings of the vehicle directly. This gradual switching off ensures the vehicle driver is prewarned about the imminent, final switching off and is thus not surprised by the final switching off. This has proven to be very positive for the driver of a vehicle.

The described device thus exhibits switching off of individual components 3, 4 as a function of the velocity V at which the vehicle is travelling. This embodiment of the device makes it possible to limit incorrect preconceptions of the driver of the vehicle with respect to the driving situation and thus to increase the road safety for the driver of the vehicle, the vehicle and the traffic as a whole.

The invention claimed is:

1. A device for improving the visibility conditions in a motor vehicle, having
   a radiation source for infrared radiation for irradiating the surroundings of the vehicle,
   an infrared-sensitive camera for taking images of at least part of the irradiated surroundings,
   a display unit for displaying collected image data, and
   a control unit for controlling the device,
   wherein a sensing unit for a recommended maximum velocity $v_{max}$ is provided and is connected to the control unit, in that a velocity sensor is provided connected to the control unit, and
   wherein the control unit is designed in such a way that when a vehicle velocity v exceeds the maximum velocity $v_{max}$ the display is switched off.

2. The device for improving the visibility conditions in a motor vehicle as claimed in claim 1, wherein the control unit is designed in such a way that when a vehicle velocity v drops below the maximum velocity $v_{max}$ the display is switched on.

3. The device for improving the visibility conditions in a motor vehicle as claimed in claim 2, wherein in that a signal transmitter is provided which is connected to the control unit and which is actuated in such a way that when the vehicle velocity v exceeds the maximum velocity $v_{max}$ a visual, audible and/or haptic warning signal is output.

4. The device for improving the visibility conditions in a motor vehicle as claimed in claim 1, wherein the control unit is designed in such a way that when a vehicle velocity v drops below the maximum velocity $v_{max}$ by a velocity difference $v_0$ the display is switched on.

5. The device for improving the visibility conditions in a motor vehicle as claimed in claim 4, wherein the velocity difference $v_0$ is selected in the vicinity of a few per cent of the maximum velocity $v_{max}$, in particular in the range of 5%.

6. The device for improving the visibility conditions in a motor vehicle as claimed in claim 1, wherein the sensing unit is designed for a recommended maximum velocity $v_{max}$ in such a way that the recommended maximum velocity $v_{max}$ is determined from the road profile or from the driving behavior of the vehicle or from received radio signals.

7. The device for improving the visibility conditions in a motor vehicle as claimed in claim 1, wherein the control unit is designed in such a way that the maximum velocity $v_{max}$ can be output on the display.

8. The device for improving the visibility conditions in a motor vehicle as claimed in claim 1, wherein the control unit is embodied in such a way that the display can be switched off delayed by a time code $t_0$.

9. The device for improving the visibility conditions in a motor vehicle as claimed in claim 1, wherein, in addition to an on/off switch for the device, an additional switch for switching on the display after switching off is provided.

10. The device for improving the visibility conditions in a motor vehicle as claimed in claim 9, wherein the additional switch is implemented in the vicinity of the steering wheel, in particular by means of a headlamp flasher switch or a rocker on the steering wheel.

11. The device for improving the visibility conditions in a motor vehicle as claimed in claim 1, wherein the display is switched off suddenly.

12. The device for improving the visibility conditions in a motor vehicle as claimed in claim 1, wherein the display is switched off in a gradual fashion.

13. The device for improving the visibility conditions in a motor vehicle as claimed in claim 1, wherein the control device is connected to the radiation source for infrared radiation and is suitable for controlling this radiation in terms of the radiation power or the orientation as a function of the vehicle velocity v.

14. The device for improving the visibility conditions in a motor vehicle as claimed in claim 1, wherein the control device is designed in such a way that the display is switched off when the vehicle velocity v exceeds a second defined maximum velocity $v_{smax}$, and the display is switched on in particular when the vehicle velocity v drops below the second predefined maximum velocity $v_{smax}$.

15. The device for improving the visibility conditions in a motor vehicle as claimed in claim 1, wherein in that the control device is embodied in such a way that, in addition to the display, the camera and/or the radiation source can also be switched off and on as a function of the velocity.

16. The device for improving the visibility conditions in a motor vehicle as claimed in claim 1, wherein the control unit is designed in such a way that signaling takes place before the display is switched off owing to the maximum speed $v_{max}$ being exceeded.

* * * * *